UNITED STATES PATENT OFFICE.

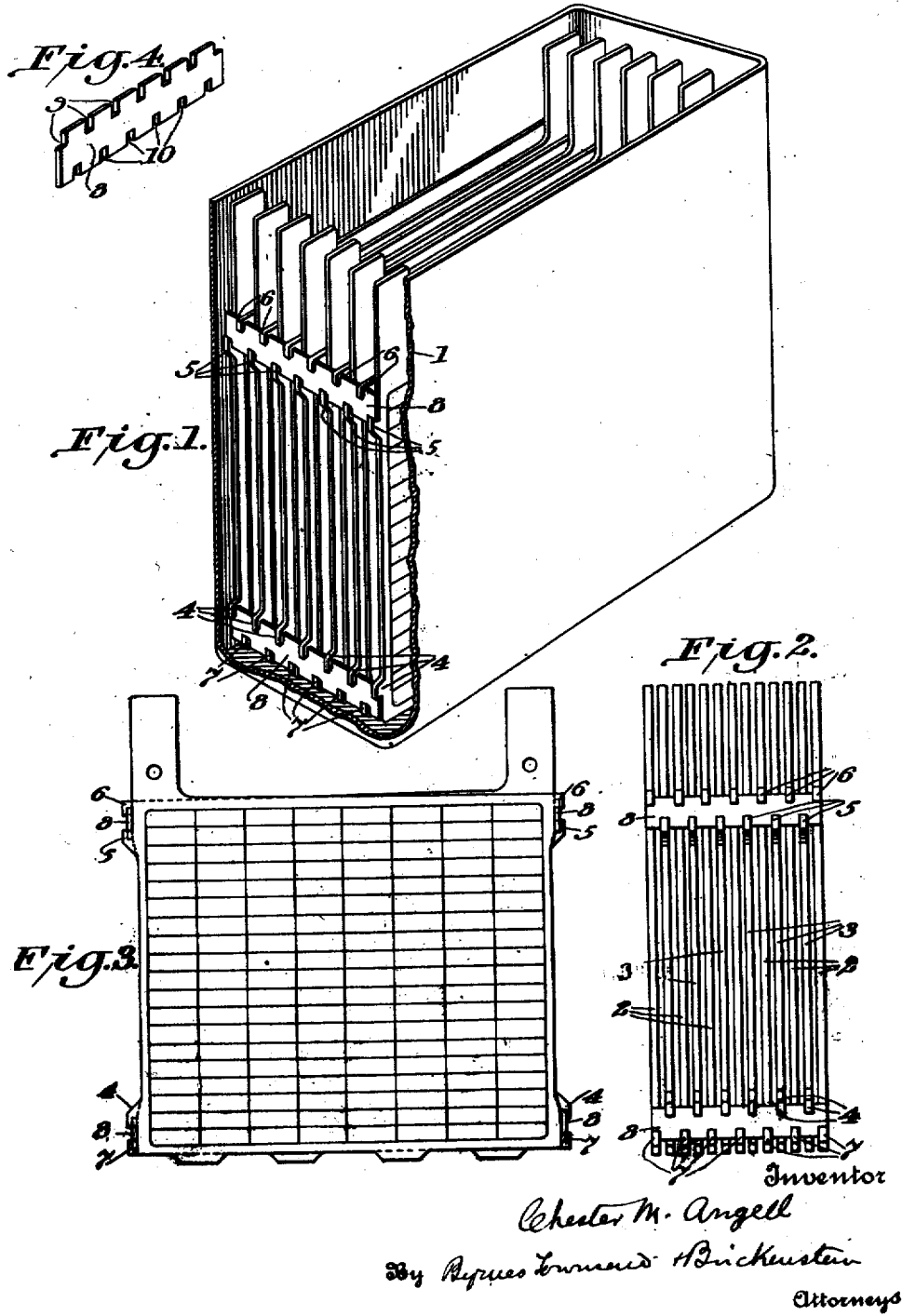

CHESTER M. ANGELL, OF CHICAGO, ILLINOIS, ASSIGNOR TO VESTA ACCUMULATOR COMPANY, OF CHICAGO, ILLINOIS, A CORPORATION OF ILLINOIS.

ACCUMULATOR-CELL.

1,319,940.   Specification of Letters Patent.   Patented Oct. 28, 1919.

Application filed September 6, 1918. Serial No. 252,931.

*To all whom it may concern:*

Be it known that I, CHESTER M. ANGELL, a citizen of the United States, residing at Chicago, in the county of Cook and State of Illinois, have invented certain new and useful Improvements in Accumulator-Cells, of which the following is a specification.

This invention relates to an improved construction of an accumulator cell wherein a positive interlocking and spacing mechanism is provided for the positive and negative plates of the cell.

It is an object of the invention to provide means, simple in construction and application, which maintain the plates rigidly associated with one another in proper spaced relation and admit of conveniently assembling and dismantling the cell.

The characteristic features of the invention will be more fully described in the specification and more particularly pointed out in the claims.

In the drawings, which form a part of the specification,

Figure 1 is a perspective view of a cell, part of the casing being broken away to show the invention;

Fig. 2 is an end view of the plates removed from the cell;

Fig. 3 is a side elevation of the plates removed from the cell, and

Fig. 4 is an isometric view of a form of insulator forming a part of the invention.

Within the jar or box 1, of the cell are grouped, the positive plates 2 and the negative plates 3, spaced from each other by the plate straps and wood separators (neither of which are shown). The means for locking the plates apart in such a manner as to form a unit having a relatively solid mechanical structure is the subject of the present invention and are as follows:

The plates, the positive plates 2 as well as the negative plates 3, have on one lateral edge lugs 4 and 5 and on the opposite edge lugs 6 and 7 so disposed that, as the positive plates and the negative plates assume relatively reversed positions, the lugs 4 and 5 on the positive plate form with the lugs 6 and 7, respectively, on the negative plate or vice versa, four groups of clamping jaws, each group to receive an insulator plate 8, preferably of celluloid, shown in detail in Fig. 4. This insulator plate 8 has notches 9 in the upper edge to receive the lugs 4 and 6 respectively, and notches 10 in the lower edge to receive the lugs 5 and 7 respectively. As will appear clearly from Fig. 3, the lugs 4 and 5 are slightly undercut to firmly hold the plates 8 in place.

After the plates 2 and 3 are placed in proper alinement the plates 8 are inserted so that the lugs occupy the notches 9 and 10, the lugs 6 and 7 are pressed downwardly and upwardly, respectively, to lock the plates in place. This may be readily accomplished by means of a suitable tool, since the lugs are fairly pliable.

In this manner the plates are held rigidly together against relative movement in the planes of the plates as well as at right angle thereto and constitute a single, solid mechanical structure adapted to stand the severest kind of treatment.

When it is desired to dismantle the cell, it is merely necessary to pry the lugs slightly apart, as by means of a suitable tool, to free the insulator plate 8 from the grip of the lugs 6 and 7, respectively. The cell may be repeatedly assembled and dismantled without materially deforming or distorting the lugs or injuring the plates and the process of assembling and dismantling may be carried out in an exceedingly short time.

It is to be noted that by the present arrangement the bending strains are so related that only a relatively thin insulator plate is needed to produce the degree of rigidity required.

The most characteristic feature, however, is the particular relative position of the lugs 4, 5, 6 and 7. Each plate has on each side a lug forming an upwardly directed shoulder to bear upwardly against one insulator plate and a lug forming a downwardly directed shoulder to bear downwardly against the second insulator plate. The relation of these shoulders on the plates of opposite sign is reversed. It is thus clear that no relative movement of the plates is possible since the insulator plates are held in place.

It is to be further noted that the distance from a projecting metal lug of a positive plate to that of the projecting lug of the nearest negative plate is considerably greater than in a construction having double the number of lugs or a construction using metal ears with slots to contain the insulators. By this arrangement the tendency of conducting particles to lodge and short circuit the positive and negative plates is greatly reduced especially in the type of cells that employ thin plates and wood separators or mats.

However, I do not wish it understood that I necessarily limit myself to the use of alternating lugs when it is not necessary or desirable.

I claim:—

1. In an accumulator cell the combination with the plates, of insulator elements extending across the edges of the plates on the same side thereof in vertically spaced relation and lugs on each plate positioned to engage the upper edge of one insulator element and the lower edge of the other insulator element respectively.

2. In an accumulator cell the combination with the plates, of insulator elements extending across the edges of the plates on the same side thereof in vertically spaced relation and lugs on each plate positioned to engage the upper edge of one insulator element and the lower edge of the other insulating element respectively, the lugs extending along one edge of each insulator element being undercut and the lugs extending along the opposite edge being pliable.

3. In an accumulator cell the combination with the plates, of insulator plates extending across the edges of the plates on the same side thereof in vertically spaced relation and each having notches in its upper and its lower edge, an upper and a lower lug on each plate, the said lugs and notches being so related that one lug on each plate engages a notch in one edge of one insulator plate and the second lug a notch in the opposite edge of the second plate.

4. In an accumulator cell the combination with the plates, of insulator plates extending across the edges of the plates on the same side thereof in vertically spaced relation and each having uniformly spaced notches in its upper edge corresponding to the positions of alternate plates and uniformly spaced notches in its lower edge corresponding to the positions of intermediate alternate plates, an upper and a lower lug on each plate, the said lugs and the said notches being so related that one lug on each plate engages a notch in the upper edge of one insulator plate and the second lug a notch in the lower edge of the second insulator plate.

In testimony whereof, I affix my signature.

CHESTER M. ANGELL.